Patented Nov. 23, 1948

2,454,539

UNITED STATES PATENT OFFICE 2,454,539

METHOD OF PREPARING RESINOUS LINEAR POLYESTERS IN CRUMBLIKE FORM

Ellington M. Beavers, Philadelphia, Pa., assignor to Rohm & Haas Company, Philadelphia, Pa., a corporation of Delaware No Drawing. Application November 23, 1945, Serial No. 630,560

8 Claims. (Cl. 260—75)

This invention relates to millable, moldable, crumblike, non-crystalline, curable, thermoplastic polyester materials and to a process of preparing same. The millable character of these polyesters permits ready compounding with fillers, curing agents, modifiers, pigments, and the like, to an extent not heretofore possible. The crumblike form of the polyesters permits ready handling, packaging, shipping, and storing. Polyesters heretofore available were deficient in these respects, and the object of this invention is to produce new polyesters in such a physical form that they may be conveniently utilized and that full advantage may be taken of their outstanding chemical characteristics.

These new polyesters are prepared by mechanically working and heating a mixture of a polyester and a peroxidic catalyst in an amount from about 0.055% to about 0.0025%, based on the polyester, until the mixture is converted into a crumblike mass. The product, which is still thermoplastic, can be easily handled, milled, and molded.

The polyesters which are employed herein are non-crystalline linear polyesters of relatively high molecular weight containing alternate chains from dicarboxylic acids and a dihydric alcohol, the latter having a chain length of at least two carbon atoms and having hydroxyl groups as the sole reactive functional groups, the chains from the dicarboxylic acids in the linear polyesters consisting of a major proportion of chains from a saturated dicarboxylic acid having a chain length of at least four carbon atoms and carboxyl groups as the sole reactive functional groups and a minor proportion of chains from an $\alpha,\beta$-unsaturated dicarboxylic acid.

The polyesters are prepared by the esterification of an unsubstituted dihydric alcohol, such as 1,2-propylene glycol, a saturated, unsubstituted, aliphatic dicarboxylic acid, such as sebacic acid, and an unsaturated $\alpha,\beta$-dicarboxylic acid such as maleic. These esters are essentially of the linear or two-dimensional type and are partially unsaturated due to the presence of the double bond in the residue of the esterified unsaturated acid. The double bonds impart thermosetting properties to the polyesters, which can, therefore, cross-link, under the influence of heat and/or a catalyst, at the double bonds to form three-dimensional polymers which are no longer thermoplastic. The conversion of the two-dimensional linear polyesters to the three-dimensional form ordinarily takes place during the molding operation and is commonly referred to as "curing."

The thoroughly "cured" polyesters are substantially insoluble and infusible and are very similar to vulcanized rubber. They are, in fact, synthetic elastomers characterized by resiliency, elasticity, and flexibility. Despite the fact that such desirable rubber-like products were heretofore known to be potentially available from unsaturated linear polyesters, the latter have not enjoyed wide commercial acceptance because of the difficulties previously encountered in handling and in the milling and the curing operations to which they had to be subjected. On the other hand, the products of this invention, in their crumblike, thermoplastic form, can be utilized to excellent advantage.

The preferred method of manufacture of the polyesters which are employed in this invention comprises heating the saturated dicarboxylic acid, the unsaturated dicarboxylic acid, and an excess of a glycol under reduced pressure in the presence of a condensation catalyst such as zinc chloride. In the early stage of the reaction, esterification takes place with the elimination of water. Thereafter, condensation occurs with the splitting out and removal of the excess glycol. Thus, linear, curable, thermoplastic resinous polyesters having very high molecular weight may be prepared.

Such a polyester, which is difficult to handle or ship and which is inherently deficient in milling and/or molding properties, is placed in a power mixer, such as a Werner-Pfleiderer. A small amount of peroxidic catalyst is added, preferably at a temperature from about 50° C. to about 80° C. Polymerization, induced by the heat and catalyst, begins and is exothermic. The mixture is maintained at a temperature of 50° C. to about 150° C., and preferably between 100° C. and 150° C. After the mixture is simultaneously heated and worked a short time, the resinous, sticky polyester is converted into a slightly tacky, crumbly mass which can be dropped directly from the mixer into shipping containers or transferred directly to milling rolls. It handles well and can be weighed, packaged, and transported without difficulty. Moreover, in the crumblike form, the polyester mills far more readily than the original material from which the crumb was prepared. At the same time, the crumblike product is thermoplastic, it flows readily when heated and pressed, and can be molded with ease.

The polyesters which are involved herein are those which are non-crystalline and which have a molecular weight above 5000. By "non-crystalline" polyesters is meant those which at normal room temperature do not display a regular X-ray pattern and cannot be cold-drawn. Non-crystallinity results from the failure of the molecules to fall into a regular space lattice. One way of assuring that the molecules do not fall into such a lattice is to employ either a dihydric alcohol or a dibasic acid, preferably the former, which has a side chain. For example, 1,2-propylene glycol, with its methyl group forming a side chain, produces non-crystalline polyesters, whereas its isomer, 1,3-propylene glycol, produces microcrystalline polyesters, all other factors remaining the same. This invention is limited to the polyesters of the non-crystalline or non-microcrystalline type.

In addition to the non-crystalline character of the polyesters, their molecular weight is also of prime importance. While a minimum molecular weight of 5000 is required, the maximum value may be as high as 50,000. It is preferred, however, that the molecular weight be between 10,000 and 30,000. Unless the molecular weight is above 5000, the molded products thereof are not suitable as elastomers. The molecular weight may be conveniently estimated from viscosity measurements and the use of Staudinger's well known formula for calculating molecular weight from viscosity data as given in his book "Die Hochmolekularen Organishen Verbindungen" (1932, Berlin).

Suitable dihydric alcohols are those which are saturated and which do not contain groups, other than the hydroxyl groups, which are reactive under the conditions employed in making linear polyesters therewith. Such alcohols are conveniently described as being unsubstituted and may be exemplified by ethylene glycol, 1,3-propylene glycol, 1,2-propylene glycol, butylene glycol, diethylene glycol, dipropylene glycol, hexamethylene glycol, and the like. Mixtures of glycols are also operable, as, for example, a mixture of ethylene glycol and 1,2-propylene glycol.

The dicarboxylic acids which are preferred are those saturated aliphatic acids having at least two carbon atoms between the carboxyl groups, or a straight chain length of at least four carbon atoms including the carbon atoms of the carboxyl groups. Furthermore, the dicarboxylic acids of first choice do not contain any groups, other than the carboxyl groups, which are reactive under the conditions employed in the formation of the linear polyesters. They may be described as unsubstituted, and the word "unsubstituted" is used in that sense here and elsewhere throughout this specification. Thus, succinic, adipic, α-methyl glutaric, pimelic, suberic, azaleic, sebacic, and higher acids may be used. Sebacic acid is particularly satisfactory, especially in conjunction with 1,2-propylene glycol and maleic anhydride. Mixtures of acids, such as a mixture of sebacic and adipic acids, may also be employed.

Suitable $\alpha,\beta$-unsaturated dicarboxylic acids are those which are unsubstituted and which combine, as do the saturated dicarboxylic acids, to form linear polyesters, made up of alternate esterified residues of the dicarboxylic acids and the dihydric alcohol. Included as operable are maleic, fumaric, citraconic, and mesaconic acids. Maleic acid is preferred and may be used in the form of its anhydride or a lower aliphatic ester which reacts by transesterification. The amount of unsaturated acid which is used has a marked effect upon the properties of the polyester. As indicated above, the presence in the polyester of the double bond in the residue of the esterified unsaturated acid imparts to the resin the capacity for forming "cross-linkages," resulting in conversion to three-dimensional polymers. It is convenient and customary to express the amount of unsaturated acid as a molar percentage of the total acids present, and this system has been adopted herein. The amount of unsaturated acid used will depend largely upon the properties to be attained in the finished polyester and somewhat upon the conditions of operation. In a general way, the maximum molecular weight obtainable in a substantially linear polyester, other factors being contant, will vary inversely with the amount of unsaturated acid employed. In cases where a polyester of extremely high molecular weight is prepared, the amount of unsaturated acid employed is very low and may be as low as 0.1%. However, the amount ordinarily used is above about 1%. The maximum amount contemplated is about 20%. For most applications, an amount between about 1% and about 6% is much preferred because this proportion of unsaturated acid assures a sufficiently high degree of unsaturation in the polyester to permit cross-linking and also permits the esterification to proceed until the product has a sufficiently high molecular weight, for example, between about 5000 and about 50,000 and preferably between about 10,000 and 30,000.

Examples of peroxidic curing catalysts which may be used in the conversion of the resinous polyester to the crumblike condition are inorganic peroxides, such as barium and sodium peroxides, and the more satisfactory organic agents such as acetyl peroxide, lauryl peroxide, stearyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide.

In the case of those polyesters containing the lower limit of about 1% of unsaturated acid, about 0.033% to about 0.055% of catalyst, based on the weight of the linear polyester, is required in the crumb-forming operation. In the case of the polyesters containing the maximum amount, 20%, of unsaturated acid, the required amount of catalyst is much less and is in the range of about 0.0025% to about 0.015%, based on the polyester. Polyesters containing intermediate amounts of unsaturated acid require amounts of catalysts between the limits given above. There is a straight-line relationship between the required amount of catalyst and the percentage of unsaturated acid employed in manufacture of the polyester.

From a practical standpoint, the amount of catalyst required is that which produces a slightly tacky, millable, and moldable crumb when the linear polyester is mechanically worked and heated at temperatures of 50°–150° C., and preferably 100° C. to 150° C. The crumb is millable when it knits together to form a band on being fed into a roller mill. Crumbs which are too highly cured drop through the rollers without knitting together and, hence, are not millable.

The polyester is moldable when it can be cured in a mold to give a true and complete reproduction of the mold's contours. Polyesters which are carried too far in the crumb-forming operation later cure too rapidly in the mold and do not give true or complete reproductions of the mold's contours. Instead, they yield products which are rough, rippled, or warped. Such materials, therefore, are not moldable in the accepted sense.

The following examples will serve to illustrate this invention:

Example 1

One thousand grams of a linear polyester having a molecular weight of about 15,000 and prepared from 1,2-propylene glycol, sebacic acid, and maleic acid, the acids being present in a ratio of 97:3 on a molar basis, was placed in a laboratory-size Werner-Pfleiderer mixer. The polyester was worked and simultaneously heated to 75° C. A slow stream of carbon dioxide was directed against the surface of the polyester in order to prevent oxidation. At the elevated temperature, 0.045% of benzoyl peroxide, based on the weight of the polyester and in the form of a 20% solution in chloroform, was added. Heating and working were continued for fifteen minutes, and, during this time, the sticky resinous polyester changed to a very slightly tacky, crumbly mass. The crumb was dropped from the mixer. It was then transferred to a cold rubber mill and was milled very readily and rapidly to a sheet resembling pale crepe rubber. This sheeted product was then compounded on the rubber mill with iron oxide and 1%, based on the polyester, of benzoyl peroxide. Portions were then molded in a standard A. S. T. M. mold at 20 pounds per square inch steam pressure for ten minutes. There resulted a rubber-like slab which completely reproduced the contours of the mold. It was resilient and elastic and had a bend-brittle point of —52° C.

Example 2

Twelve hundred twenty-five grams of a substantially linear polyester having a molecular weight of about 10,000, and prepared from ethylene glycol, 1,2-propylene glycol, sebacic acid, and maleic anhydride, the glycols being present in a ratio of 80:20 on a weight basis and the ratio of sebacic acid to maleic anhydride being 80:20 on a molar basis, was placed in a mixer and was simultaneously heated and worked at a temperature of 60° C. Tertiary butyl hydroperoxide, in an amount equal to .0075% of the weight of the polyester, was added. Heating and working continued, and the temperature rose rapidly to about 110° C. and was maintained between 100° C. and 120° C. After a working and heating period of fifteen minutes, the polyester was in crumb form and had excellent milling characteristics as contrasted with a portion of the same polyester which had not been subjected to the above treatment.

The process of this invention, which relates to improvements in the milling and molding qualities of curable, non-crystalline, linear polyesters of molecular weight above about 5000, is very valuable commercially because it has made it possible to produce synthetic elastomers with a minimum of effort from linear polyesters formerly believed to have, at best, only limited utility.

I claim:

1. A process of preparing millable, moldable, crumblike, curable thermoplastic material which comprises simultaneously mechanically working in a power mixer of the kneading type and heating, at 50° C. to 150° C. until a crumb is formed, a mixture of a peroxidic curing catalyst and a linear, unsaturated, thermoplastic non-crystalline polyester of molecular weight of 5000 to 50,000, said ester being the product of condensing by heating together a saturated unsubstituted glycol, a saturated unsubstituted dicarboxylic acid containing a minimum of four carbon atoms, and an unsubstituted $\alpha,\beta$-unsaturated dicarboxylic acid, said unsaturated acid being present in an amount from 1% to 20% of the total acids on a molar basis, one of said glycol and said saturated acid containing a branched chain, and said peroxidic curing catalyst being present in an amount from 0.055% to 0.0025%, based on said polyester, and being inversely proportional to the percentage of said unsaturated acid used.

2. A process of preparing millable, moldable, crumblike, curable thermoplastic material which comprises simultaneously mechanically working in a power mixer of the kneading type and heating, at 50° C. to 150° C. until a crumb is formed, a mixture of a peroxidic curing catalyst and a linear, unsaturated, thermoplastic non-crystalline polyester of molecular weight of 10,000 to 30,000, said ester being the product of condensing by heating together a saturated unsubstituted glycol, a saturated unsubstituted dicarboxylic acid containing a minimum of four carbon atoms, and maleic acid, said maleic acid being present in on amount from 1% to 20% of the total acids on a molar basis, one of said glycol and said saturated acid containing a branched chain, and said peroxidic curing catalyst being present in an amount from 0.055% to 0.0025%, based on said polyester, and being inversely proportional to the percentage of said maleic acid used.

3. A process of preparing millable, moldable, crumblike, curable thermoplastic material which comprises simultaneously mechanically working in a power mixer of the kneading type and heating, at 50° C. to 150° C. until a crumb is formed, a mixture of a peroxidic curing catalyst and a linear, unsaturated, thermoplastic non-crystalline polyester of molecular weight of 5000 to 50,000, said ester being the product of condensing by heating together 1,2-propylene glycol, sebacic acid, and maleic acid, said maleic acid being present in an amount from 1% to 20% of the total acids on a molar basis and said curing catalyst being present in an amount from 0.055% to 0.0025%, based on said polyester, and said amount being inversely proportional to the percentage of said maleic acid used.

4. A process of preparing millable, moldable, crumblike, curable thermoplastic material which comprises simultaneously mechanically working in a power mixer of the kneading type and heating, at 50° C. to 150° C. until a crumb is formed, a mixture of an organic peroxidic curing catalyst and a linear, unsaturated, thermoplastic non-crystalline polyester of molecular weight of 10,000 to 30,000, said ester being the product of condensing by heating together 1,2-propylene glycol, sebacic acid, and maleic acid, said maleic acid being present in an amount from 1% to 6% of the total acids on a molar basis and said organic curing catalyst being present in an amount from 0.055% to 0.0025%, based on said polyester, and said amount being inversely proportional to the percentage of said maleic acid used.

5. A new composition of matter comprising a millable, moldable, crumblike, curable, thermoplastic linear polyester prepared by the process of claim 1.

6. A new composition of matter comprising a millable, moldable, crumblike, curable, thermoplastic linear polyester prepared by the process of claim 2.

7. A new composition of matter comprising a millable, moldable, crumblike, curable, thermoplastic linear polyester prepared by the process of claim 3.

8. A new composition of matter comprising a millable, moldable, crumblike, curable, thermoplastic linear polyester prepared by the process of claim 4.

ELLINGTON M. BEAVERS.

REFERENCES CITED

The following references are of record in the file of this patent:

UNITED STATES PATENTS

| Number | Name | Date |
|---|---|---|
| 2,322,756 | Wallder | June 29, 1943 |
| 2,363,581 | Frosch | Nov. 28, 1944 |
| 2,416,282 | Biggs | Feb. 25, 1947 |

OTHER REFERENCES

Biggs & Fuller Chem. and Eng. News, June 25, 1943, pp. 962–63.

Warden, W. B., India Rubber World, Dec. 1944, pp. 309–11.

Baker, W. O., Bell Laboratories Record, April 1945, pp. 97–100.

Vanderbilt Rubber Handbook, 8th ed., 1942, J. M. Ball (page 275).